United States Patent [19]

Kittle et al.

[11] 4,026,846

[45] May 31, 1977

[54] SILICONE RUBBER SPONGE COMPOSITION, METHOD OF MAKING THE SPONGE

[75] Inventors: Ronald E. Kittle, Midland; Keith E. Polmanteer, Weidman, both of Mich.

[73] Assignee: Dow Corning Corporation, Midland, Mich.

[22] Filed: July 3, 1975

[21] Appl. No.: 592,961

[52] U.S. Cl. .......................... 260/2.5 S; 260/37 SB
[51] Int. Cl.² .................................. C08J 9/10
[58] Field of Search .................... 260/2.5 S

[56] References Cited

UNITED STATES PATENTS

| | | |
|---|---|---|
| 3,271,332 | 9/1966 | Bond et al. .................... 260/2.5 S |
| 3,284,485 | 11/1966 | Goossens .................... 260/2.5 S |
| 3,395,775 | 8/1968 | Smith .......................... 260/2.5 S |
| 3,565,858 | 2/1971 | Kuiege ........................ 260/2.5 S |
| 3,770,662 | 11/1973 | Hennessy et al. ............. 260/2.5 S |
| 3,791,998 | 2/1974 | Burns .......................... 260/2.5 S |

*Primary Examiner*—Morton Foelak
*Attorney, Agent, or Firm*—Roger H. Borrousch

[57] ABSTRACT

A sponge prepared from silicone rubber using 4,4'-oxybis(benzenesulfonhydrazide) as a blowing agent has improved heat stability when calcium oxide, magnesium oxide or a mixture of these two oxides is present in the composition. The sponge prepared using these oxides has a lower compression deflection after heat aging than the compositions which do not contain the oxides.

7 Claims, No Drawings

SILICONE RUBBER SPONGE COMPOSITION, METHOD OF MAKING THE SPONGE

BACKGROUND OF THE INVENTION

1. Field of the Invention

This invention relates to spongeable silicone rubber compositions, a method of making the silicone rubber sponge and a sponge prepared thereby.

2. Description of the Prior Art

The use of 4,4'-oxybis(benzenesulfonhydrazide) as a blowing agent in rubbers is known in the art, as shown by U.S. Pat. No. 2,951,819 which describes both natural and synthetic rubbers which contain stearic acid, being blown with a number of blowing agents including 4,4'-oxybis(benzenesulfonhydrazide). Silicone rubber is described by this patent as one of the synthetic rubbers. This patent does not suggest what might happen upon heat aging of silicone rubber using 4,4'-oxybis(-benezenesulfonhydrazide) as the blowing agent. The applicants found that when this compound was used as a blowing agent in silicone rubber, a sponge formed but became brittle upon heat aging.

SUMMARY OF THE INVENTION

It is therefore an object of the invention to provide a silicone rubber sponge which does not become brittle on heat aging when using 4,4'-oxybis(benzenesulfonhydrazide).

Silicone rubber sponge can be prepared by using 4,4'-oxybis(benzenesulfonhydrazide) and not become brittle when heat aged, if magnesium oxide, calcium oxide or a mixture of both oxides is present in the silicone rubber composition. These sponges are particularly useful for applications where the sponge comes into contact with high temperatures.

DESCRIPTION OF THE INVENTION

This invention relates to a method for making a silicone rubber sponge comprising heating a silicone rubber composition comprising a polydiorganosiloxane gum, a reinforcing silica filler, an organic peroxide and 4,4'-oxybis(benzenesulfonhydrazide) above the activation temperature of the organic peroxide to obtain a silicone rubber sponge, the improvement consisting essentially of having present in the silicone rubber composition a finely divided metal oxide selected from the group consisting of magnesium oxide, calcium oxide, and mixtures thereof.

Silicone rubber compositions are well known in the art and many have been blown to form sponges. For the purpose of this invention, any of the silicone rubber compositions can be used and blown with 4,4'-oxybis(-benzenesulfonhydrazide) as the blowing agent. These silicone rubber compositions comprise a polydiorganosiloxane gum, a silica filler and an organic peroxide. Other additives can also be present, such as plasticizers, anti-crepe agents, heat stability additives, pigments and colorants, extending fillers, flame retardant additives, compression set additives, anti-bloom additives, handling additives and the like. The polydiorganosiloxane gums can generally be described as benzene soluble and having a Williams plasticity of greater than 0.030 inch. The organic groups on the polydiorganosiloxane gums can be any of those found in the commercial silicone rubber stocks and include methyl, phenyl, vinyl, among others. These gums are most commonly endblocked with triorganosiloxy units or hydroxyl radicals. The silica fillers are the reinforcing type silicas, such as fume silica, precipitated silica, silica aerogels and silica xerogels which may be treated to make the surface hydrophobic, such as with organosilazanes, organochlorosilanes, hydroxylated organosiloxane fluids and polydiorganosiloxane cyclics. The organic peroxide can be any of those used for vulcanizing silicone rubber such as tertiary-butylperbenzoate, di-tertiary-butylperoxide, dicumylperoxide and 2,5-bis(tertiary-butylperoxy)-2,5-dimethylhexane.

The preferred silicone rubber compositions for sponging in this method comprise for each 100 parts by weight of polydiorganosiloxane gum, 5 to 70 parts by weight of a reinforcing silica filler, 0.1 to 5 parts by weight of an organic peroxide, 0.5 to 5 parts by weight of 4,4'-oxybis(benzenesulfenhydrazide) and 0.5 to 15 parts by weight of a finely divided magnesium oxide, calcium oxide or mixture thereof. The polydiorganosiloxane gums preferably contain organic radicals which are at least 90 percent methyl.

These silicone rubber compositions can be prepared by any of the conventional silicone rubber mixing methods such as by using a dough type mixer, a rubber mill and the like. After the silicone rubber compositions are prepared containing the 4,4'-oxybis(benzenesulfonhydrazide) and metal oxide, the composition is heated above the activation temperature of the organic peroxide to obtain a sponge. The activation temperatures for the organic peroxide vary from peroxide to peroxide, but are above 100° C, for most organic peroxides. Peroxides which are activated at temperatures lower than 100° C. are usually considered too difficult to handle safely. The 4,4'-oxybis-(benzenesulfonhydrazide) is activated in the same temperature range as the organic peroxide and thus the blowing process and the vulcanization process take place at substantially the same time. For most peroxides, the temperature for forming a sponge is between 100° and 180° C. A sponge can usually be formed and cured by vulcanizing for from 5 to 15 minutes and a post cure may be desirable for some silicone rubbers after the vulcanization and the foaming process is completed.

The metal oxides useful to provide the sponges of this invention with the ability to retain their flexibility after heat aging are finely divided magnesium oxide, calcium oxide or mixtures of these two oxides. These metal oxides are readily available from a number of commercial sources. The amounts of metal oxide useful in this invention are not narrowly critical and are preferably from 0.5 to 15 parts by weight based on 100 parts by weight of the polydiorganosiloxane gum.

The sponges of this invention can be used in places where other sponges are used, but are especially useful where high temperature conditions are contacted because the sponges do not become as brittle as sponges prepared without the metal oxide. The sponge is useful for insulating such as on aircraft where wide temperature variations are observed and in medical applications.

The following examples are presented for illustrative purposes only and should not be construed as limiting the invention which is properly delineated in the claims.

EXAMPLE 1

A silicone rubber composition was prepared by mixing 100 parts by weight of hydroxyl endblocked polydiorganosiloxane gum having a Williams plasticity of about 0.06 inch, having about 9.6 weight percent phenylmethylsiloxane units, 0.16 weight percent methylvinylsiloxane units and the remainder being dimethylsiloxane units, 23.2 parts by weight of a reinforcing fume silica filler, 7.7 parts by weight of a hydroxyl endblocked polydimethylsiloxane fluid having about 4 weight percent silicon-bonded hydroxyl radical, 1.85 parts by weight of tertiary-butylperbenzoate, 1.0 part by weight of ferric oxide, 2.0 parts by weight of 4,4'-oxybis(benzenesulfonhydrazide) and 5.0 parts by weight magnesium oxide.

A sponge was prepared by placing some of the above silicone rubber composition in a chase backed with polytetrafluoroethylene coated glass fabric with the chase having a total thickness of 0.955 centimeter and heating the assembly in a press for 10 minutes at 149° C. Another sponge made from the same silicone rubber composition was prepared in the same manner except after the press vulcanization step, the product was heated in an oven for 10 minutes at 204° C. Both samples prepared above were acceptable sponges after heat aging for 12 hours at 249° C. and were not hard or brittle.

EXAMPLE 2

A silicone rubber composition was prepared by mixing 100 parts by weight of dimethylvinylsiloxy endblocked polydiorganosiloxane gum having a Williams plasticity of about 0.06 inch and having about 0.07 mol percent methylvinylsiloxane units and 99.93 mol percent dimethylsiloxane units, 6.4 parts by weight of a hydroxyl endblocked polydimethylsiloxane fluid having about 4 weight percent silicon-bonded hydroxyl radical, 0.6 part by weight of a copolymer of monomethylsiloxane units, monophenylsiloxane units, dimethylsiloxane units, methylvinylsiloxane units and trimethylsiloxane units, 24.8 parts by weight of a fumed silica filler, 1.25 parts of ferric oxide, 3.75 parts by weight of 4,4'-oxybis(benzenesulfonhydrazide), 0.6 parts by weight of 2,5-bis(tertiarybutylperoxy)-2,5-dimethylhexane and an amount of metal oxide as defined in the Table.

Sponges were prepared by vulcanizing in a chase as described in Example 1 and heating for 10 minutes at 171° C. After the sponges were prepared, the compression deflection was determined by ASTM procedure ASTM-D-1056 for the vulcanized sample and after heat aging for 12 hours at 249° C. The results were as shown in the Table where the sponge was considered too hard and brittle when the compression deflection value exceeded 10 after the heat aging step.

Table

| Reference Number | Metal Oxide | Parts by Weight, Metal Oxide | Compression Vulcanization | Deflection after, Heat Aging |
|---|---|---|---|---|
| 1. | None | 0.0 | 5 | >25 |
| 2. | MgO | 6.85 | 5.4 | 9.0 |
| 3. | MgO CaO | 0.6 6.7 | 4.1 | 5.3 |
| 4. | MgO | 12.1 | 3.5 | 7.2 |
| 5.* | ZnO | 6.7 | 5.8 | 22.6 |

*Presented for comparative purposes.

That which is claimed is:

1. In a method for making a silicone rubber sponge comprising heating a silicone rubber composition consisting essentially of a polydiorganosiloxane gum having organic groups selected from the group consisting of methyl, phenyl, vinyl, and mixtures thereof and has at least 90 percent of the organic groups being methyl, a reinforcing silica filler, an organic peroxide and 4,4'-oxybis(benzenesulfonhydrazide) above the activation temperature of the organic peroxide and the activation temperature of the 4,4'-oxybis(benzenesulfonhydrazide) whereby the blowing process and the vulcanization process take place at substantially the same time to obtain a silicone rubber sponge, the improvement consisting essentially of having present in the silicone rubber composition a finely divided metal oxide selected from the group consisting of magnesium oxide, calcium oxide, and mixtures thereof.

2. The method in accordance with claim 1 in which the metal oxide is present in an amount of from 0.5 to 15 parts by weight based on 100 parts by weight of the polydiorganosiloxane gum.

3. The method in accordance with claim 2 in which the metal oxide is magnesium oxide.

4. The method in accordance with claim 2 in which the metal oxide is a mixture of calcium oxide and magnesium oxide.

5. A spongeable silicone rubber composition consisting essentially of
   A. 100 parts by weight of a polydiorganosiloxane gum having organic groups selected from the group consisting of methyl, phenyl, vinyl, and mixtures thereof, at least 90 percent of the organic groups being methyl,
   B. 5 to 70 parts by weight of a reinforcing silica filler,
   C. 0.1 to 5 parts by weight of an organic peroxide,
   D. 0.5 to 5 parts by weight of 4,4'-oxybis(benzenesulfonhydrazide) and
   E. 0.5 to 15 parts by weight of a finely divided metal oxide selected from the group consisting of magnesium oxide, calcium oxide, and mixtures thereof.

6. The spongeable silicone rubber composition according to claim 5 in which the metal oxide is magnesium oxide.

7. The spongeable silicone rubber composition according to claim 5 in which the metal oxide is a mixture of calcium oxide and magnesium oxide.

* * * * *

UNITED STATES PATENT AND TRADEMARK OFFICE
CERTIFICATE OF CORRECTION

PATENT NO. : 4,026,846

DATED : May 31, 1977

INVENTOR(S) : Ronald E. Kittle and Keith E. Polmanteer

It is certified that error appears in the above-identified patent and that said Letters Patent are hereby corrected as shown below:

The title "Silicone Rubber Sponge Composition, Method of Making The Sponge" should read "Silicone Rubber Sponge Composition, Method of Making the Sponge And The Sponge Made Thereby"

Column 2, line 16 - the word "(benzenesulfenhydrazide)" should read "(benzenesulfonhydrazide)"

Signed and Sealed this

Twenty-third Day of February 198

[SEAL]

Attest:

GERALD J. MOSSINGHOFF

Attesting Officer    Commissioner of Patents and Trademarks